Patented Nov. 19, 1929

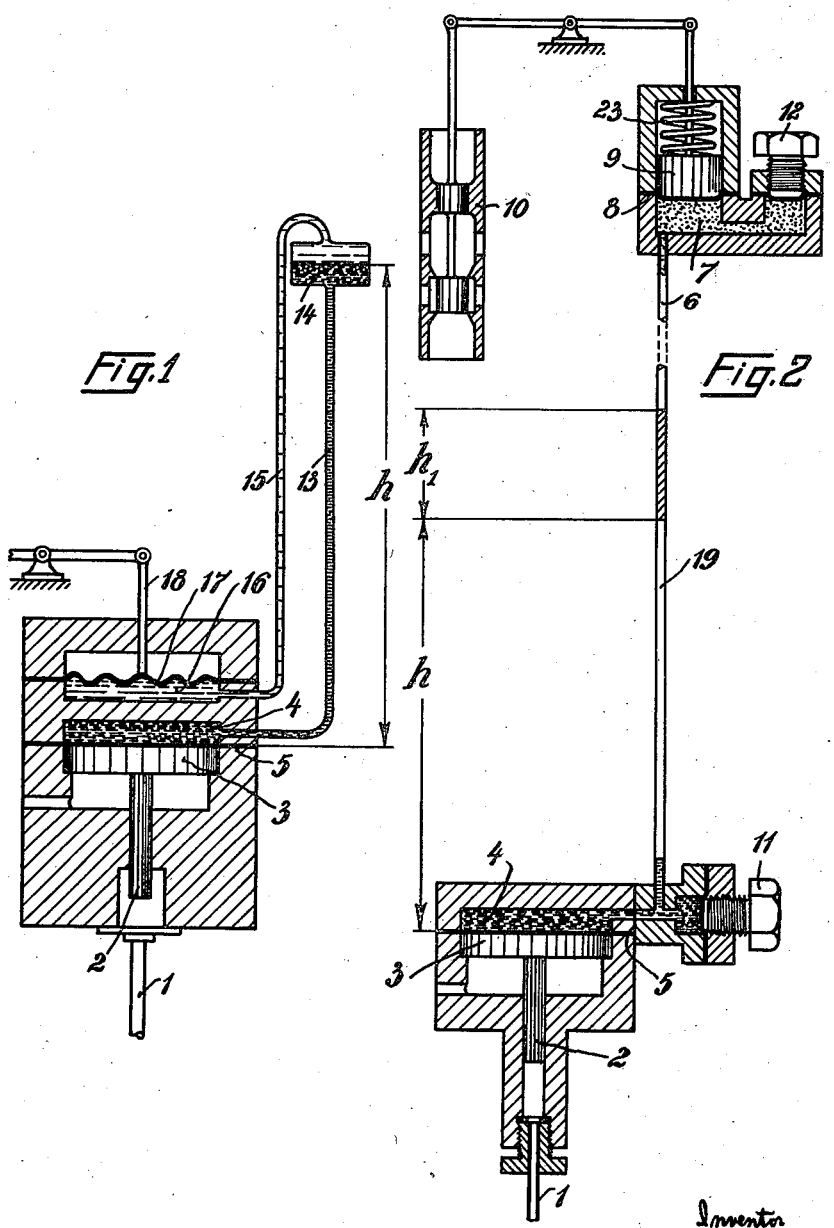

1,735,964

UNITED STATES PATENT OFFICE

MARTIN EULE, OF BERLIN-SPANDAU, GERMANY, ASSIGNOR TO SIEMENS-SCHUCKERT-WERKE GESELLSCHAFT MIT BESCHRANKTER HAFTUNG, OF BERLIN-SIEMENS-STADT, GERMANY, A CORPORATION OF GERMANY

DEVICE FOR TRANSMITTING PRESSURE IMPULSES

Application filed April 21, 1927, Serial No. 185,636, and in Germany April 30, 1926.

My invention relates to a device for transmitting pressure impulses, more particularly in conjunction with pressure regulators for steam power plants.

For transmitting pressure impulses devices are frequently employed in which the regulating pressure operates upon a diaphragm which either functions merely as a packing or simultaneously as a packing and spring. In order to permit the use of a diaphragm as soft and flexible as possible and thus to obtain as large as possible a deflection of the diaphragm for comparatively small pressure fluctuations, it has been proposed to balance the regulating pressure up to a minute value by the static pressure of a column of liquid.

In such devices it is necessary to transmit the deflections of the diaphragm to an auxiliary control device. It has now been ascertained that it is rather difficult to lead the element which transmits the impulse, and which usually consists of a rod joined to the diaphragm, so tightly out of the diaphragm casing that the balancing liquid remains enclosed in the diaphragm casing. Particularly difficult solutions of the problem arise if mercury is employed as balancing liquid, since mercury is able to pass through the minutest interstices or openings.

The object of my invention is to eliminate this drawback.

My invention consists substantially in locating above the balancing liquid a specifically lighter liquid, which transmits the fluctuations of the balancing column developed in the event of pressure variations upon the control mechanism for the medium to be regulated. In this way it is possible to eliminate altogether movable parts to be passed out of the diaphragm casing.

In the drawings affixed hereto are diagrammatically illustrated two embodiments of my invention, by way of example.

In these drawings:

Fig. 1 represents a vertical section through a simple design of my improved device, and Fig. 2, a vertical section through a modified device in which external influences can also be compensated.

Like parts are indicated by like numerals of reference in both figures of the drawing.

In both cases illustrated the problem is to keep constant an impulse pressure, which acts through the pipe 1. The medium to be regulated moves a plunger 2 joined to a piston 3 of larger diameter. The specific pressure is thus reduced in the ratio of the free areas of the plunger 2 and the piston 3. It will be understood that in the case of low pressure of the medium this pressure reduction may be omitted altogether. Above the piston is provided a heavy balancing liquid, for instance mercury enclosed in a chamber 4. The piston 3 is sealed against this chamber 4 by a rubber diaphragm 5 which renders leakage losses impossible.

Referring to Fig. 1 of the drawing, it will be seen that this chamber 4 communicates with an ascending pipe 13 in which the mercury rises up to the height $h$. In order that the height $h$ of the balancing column may be maintained during movements of the piston 3, the pipe 13 terminates in a compensating vessel 14 of such large dimensions that the liquid displaced from the chamber 4 cannot cause a detrimental variation in the height of the level of the mercury. From the compensating vessel 14 a pipe 15 leads to the chamber 16 which is sealed by a diaphragm 17. The space of the compensating vessel 14 above the mercury, and chamber 16 and the pipe 15 are filled with a specifically lighter liquid, for instance water. To the diaphragm 17 is joined the transmission rod 18 of an auxiliary control gear. If the impulse pressure in pipe 1 exceeds the counter pressure of the balancing mercury column $h$, mercury is displaced from the chamber 4 and simultaneously also light liquid is displaced from the compensating vessel 14 into the chamber 16. The diaphragm 17 is thus deflected upwards and the control gear 18 operated. In consequence of the deflection of the diaphragm 17, however, the back-pressure or reaction upon the liquid in the chamber 16 increases and thus also in the chamber 4, i. e. an increased impulse pressure corresponds with an increased back-pressure of the diaphragm. The back-pressure of the balancing column remains in this arrangement substantially unchanged. Assuming that the impulse pressure is $p_1$ and the balancing pressure $p_2$, merely the difference $p_1 - p_2$ becomes operative. The just described device thus permits the working with a diaphragm and a balancing liquid and of transmitting the deflections of the diaphragm mechanically to a link system without sealing or packing of movable parts against a liquid being necessary.

In the above described example the equilibrium is attained by the counter-force of the diaphragm. In the example illustrated in Fig. 2 of the drawing, on the other hand, the balancing column itself produces the necessary equilibrium. If in the device according to Fig. 2 liquid is displaced from the chamber 4 by the piston 3 the column of liquid in the pipe 19 rises by the displaced amount. The movement of the column in the pipe hereby takes place in the regulating range within the regulating height $h_1$. Simultaneously with the balancing liquid the superimposed specifically lighter liquid in the cylinder 7 is displaced and thereby adjusts a piston 9 which is packed by a diaphragm 8. Piston 9 transmits its motion to an auxiliary control gear 10, which in the present example may constitute a pair of piston valves for any suitable purpose.

By correspondingly selecting the cross-sections of the chamber 4 and the pipe 19, it is thus possible to obtain a definite ratio between the variations of the impulse pressure within the regulating range and the pressure variations resulting from the variations of the regulating height, either so that a linear relation exists between both, i. e., that with a variation of the impulse pressure a corresponding variation of the balancing column pressure occurs, or by choosing a partial ratio only and by employing an additional spring for producing the equilibrium, which spring 23 in the example illustrated loads the piston 9 and thus exerts a back-pressure upon the liquid in the chamber 7 or 4. The employment of an additional spring involves a substantial advantage, in so far as it is possible to reduce the height of the balancing mercury column and in certain circumstances to omit the mercury column altogether.

Fig. 2 of the drawings illustrates furthermore compensation devices in the form of screw plugs 11 and 12 which serve to compensate external influences (pressure and temperature fluctuations) and allow of a variation of the regulating range within narrow limits.

Various modifications and changes may be made without departing from the spirit and the scope of the invention, and I desire, therefore, that only such limitations shall be placed thereon as are imposed by the prior art.

I claim as my invention:—

1. In a device for transmitting pressure impulses, having a liquid column for balancing the pressure of the medium to be regulated up to a minute value, a specifically lighter transmitting liquid resting upon the balancing liquid for transmitting the volume fluctuations of the balancing column developed during the pressure impulse variations and a control gear actuated by the movement of said transmitting liquid.

2. A device for transmitting pressure impulses comprising a cylinder and a piston therein, disposed to respond to the varying pressure impulses, said cylinder also containing mercury and a flexible diaphragm separating the mercury from the piston, a substantially vertical pipe rising from said cylinder and containing mercury to a sufficient height to balance a desired portion of the impulse pressure to be transmitted, a control cylinder disposed at the upper end of said pipe and containing a liquid lighter than mercury which liquid extends down to the top of said mercury column, a piston in said control cylinder and a flexible diaphragm separating said liquid from the piston in said control cylinder, a control gear connected to said last named piston, and pressure means effective upon said liquid column for balancing the remainder of said impulse pressure.

3. In a device for transmitting pressure impulses of the class described, in combination, a cylinder, a piston movable in said cylinder and exposed to the pressure impulses, said cylinder containing mercury above said piston, and a flexible rubber packing disc disposed between said piston and said mercury, an ascending pipe in communication with said cylinder and containing a balancing mercury column, a control cylinder containing water and being disposed at the upper end of said ascending pipe, a piston movable in said control cylinder, a flexible packing disc located between the piston and the water in said control cylinder, and a control gear connected to the outer end of said last named piston.

4. In a device for transmitting pressure impulses of the class described, in combination, a cylinder, a piston movable in said cylinder and exposed to the pressure impulses, said cylinder containing mercury disposed above said piston and a flexible rubber packing disc disposed between said piston and said mercury, an ascending pipe in communication with said cylinder and containing a balancing mercury column, a control cylinder containing water and being located at the upper end of said ascending pipe, a piston movable in said control cylinder, a flexible packing disc located between the piston and the water in said control cylinder, a loading spring arranged between the outer control cylinder end and the piston therein, a piston rod extending outside of said control cylinder, and a control gear connected to the outer end of said piston rod.

5. In a device for transmitting pressure impulses of the class described, in combination, a cylinder, a piston movable in said cylinder and exposed to the pressure impulses, said cylinder containing mercury disposed above said piston and a flexible rubber packing disc arranged between said piston and said mercury, an ascending pipe in communication with said cylinder and containing a balancing mercury column, a control cylinder closed at the top and containing water and being disposed at the upper end of said ascending pipe, a control piston movable in said control cylinder, a flexible packing disc located between said control piston and the water in said control cylinder, a loading spring between the top of said control cylinder and its piston, a piston rod extending through the top of said control cylinder, a control gear connected to the outer end of said piston rod, and devices adapted to compensate for volume and pressure variations of the operating liquids of the system due to external influences, and permitting a variation of the regulating range.

In testimony whereof I affix my signature.

MARTIN EULE.